United States Patent
Allen et al.

(10) Patent No.: US 6,299,150 B1
(45) Date of Patent: Oct. 9, 2001

(54) COMPOSITE SPRING MOUNT SHOCK ABSORBER

(75) Inventors: Noel L. Allen; Allen L. Arndt, both of Burnsvillle; Scott M. Ralston, Farmington, all of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/495,694

(22) Filed: Feb. 1, 2000

(51) Int. Cl.[7] ................................. F16F 1/06; F16F 1/12
(52) U.S. Cl. .................... 267/178; 267/136; 267/147; 267/167; 267/180; 267/182; 188/378
(58) Field of Search ...................... 188/378; 267/136, 267/147, 148, 149, 166, 166.1, 167, 169, 170, 174, 177, 178, 179, 180, 182, 250, 286, 287, 288, 291; 248/566, 570, 638

(56) References Cited

U.S. PATENT DOCUMENTS

| | | | | |
|---|---|---|---|---|
| 2,313,171 | * | 3/1943 | Piliero | 267/148 |
| 4,783,038 | * | 11/1988 | Gilbert et al. | 267/148 |
| 5,062,507 | * | 11/1991 | Roche | 188/378 |
| 5,149,066 | * | 9/1992 | Snaith et al. | 267/136 |
| 5,499,790 | * | 3/1996 | Hay | 267/148 |
| 5,522,585 | * | 6/1996 | Loziuk | 267/148 |
| 5,549,285 | * | 8/1996 | Collins | 267/148 |
| 5,603,490 | * | 2/1997 | Folsom | 267/149 |
| 5,897,093 | * | 4/1999 | Le Derf | 248/628 |
| 6,120,014 | * | 9/2000 | Lee et al. | 267/169 |

* cited by examiner

Primary Examiner—Robert J. Oberleitner
Assistant Examiner—Devon Kramer
(74) Attorney, Agent, or Firm—Glenn W. Bowen; Patrick M. Hogan

(57) ABSTRACT

A spring element is made of a spring material and is formed into a generally elliptical shape. Two mounting pins extend in a normal direction through parallel relatively short segments of said elliptically-shaped spring element. The mounting pins are substantially aligned with the shorter of the two axis of the elliptically-shaped spring element so as to extend both inwardly and outwardly of said elliptically-shaped spring element. An elastomeric coating is applied around substantially all of the spring elements and a pair of blocks, each of which surrounds one of the mounting pins receives one of the mounting pins. A number of spring elements are joined together by two parallel, spaced-apart coupling links which contain cavities therein to receive one of the blocks of each of the spring elements.

8 Claims, 2 Drawing Sheets

COMPOSITE SPRING MOUNT SHOCK ABSORBER

FIELD OF THE INVENTION

The invention is related to spring mount shock absorbers and more particularly to shock absorbers that are designed to replace wire rope-type shock absorbers that are used on ships and in other applications to reduce shocks. This new shock absorber has improved shock and vibration, isolation, corrosion resistance, tuneability and appearance. It may be used as a direct replacement for existing wire rope designs.

BACKGROUND OF THE INVENTION

The use of wire rope shock absorbers, especially on board ships, leads to constant maintenance problems due to corrosion, wire fraying and breaking. Also, these shock absorbers have only a limited amount of adjustability or tuning with respect to shock and vibration isolation, and they are often unsightly in appearance. Their isolation of shock and vibration forces is also inferior to devices made in accordance with the present invention. Furthermore, strands of wire rope elements that run in loops have to be joined at some point. The joining structure is likely to effect the isolation characteristics of the element. If the wire rope breaks, the entire structure must be replaced. If a continuous wire is run from loop to loop, the wire will transmit forces in a helical manner along the wire rope throughout the entire structure. The substantially independent isolation of each spring element from the other, so that forces are controlled in a desired manner, is another advantage of the present invention that cannot be achieved with helically wound continuous wire rope devices.

SUMMARY OF THE INVENTION

A spring element is formed of spring material preferably metal, and is shaped into a generally shape. A first mounting pin extends in a normal direction through a first surface of the spring element so that it is substantially aligned with the shorter of the two axis of the elliptical shape. The first mounting pin extends both inwardly and outwardly of the elliptical shape. A second mounting pin is provided that extends through a second surface of the ellipitcal shape, which is parallel to the first surface and thus the pin passes along the shorter of the two axis of the elliptical shape. The spring element may be enclosed in elastomeric material. Composite spring mounts can be formed by providing two coupling links, one of which receives a first mounting upon from each of the spring element adjacent its first surface, and the other of which receives a second mounting pin from each spring element adjacent its second mounting pin.

DESCRIPTION OF THE INVENTION

Figure 2:
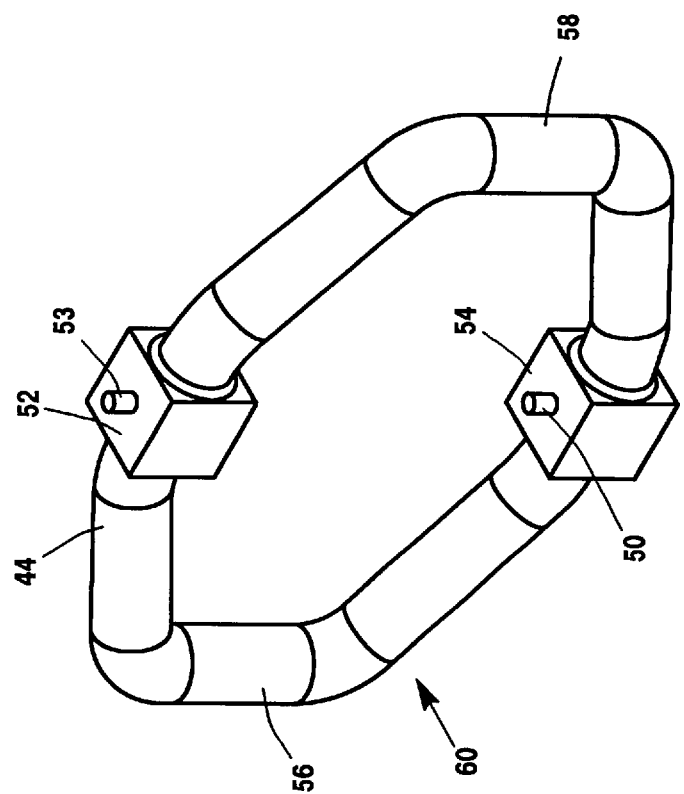
FIG. 2 is a single spring element as shown in FIG. 1 in which elastomer damping material is molded around substantially the entire spring element.
Figure 1:
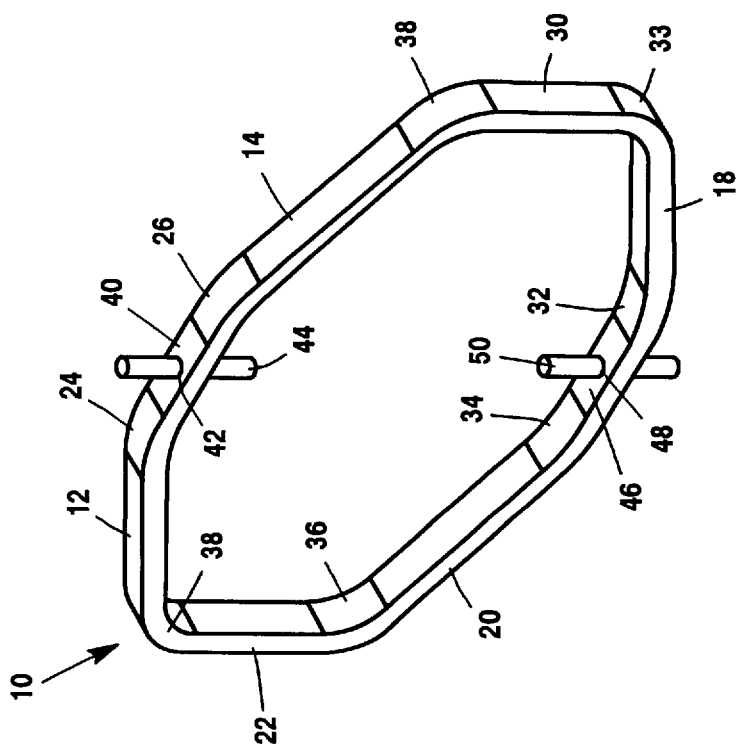
FIG. 1 is a perspective view of a single shock mount spring element that is suitable for implementation in a multiple spring shock absorber.
Figure 3:
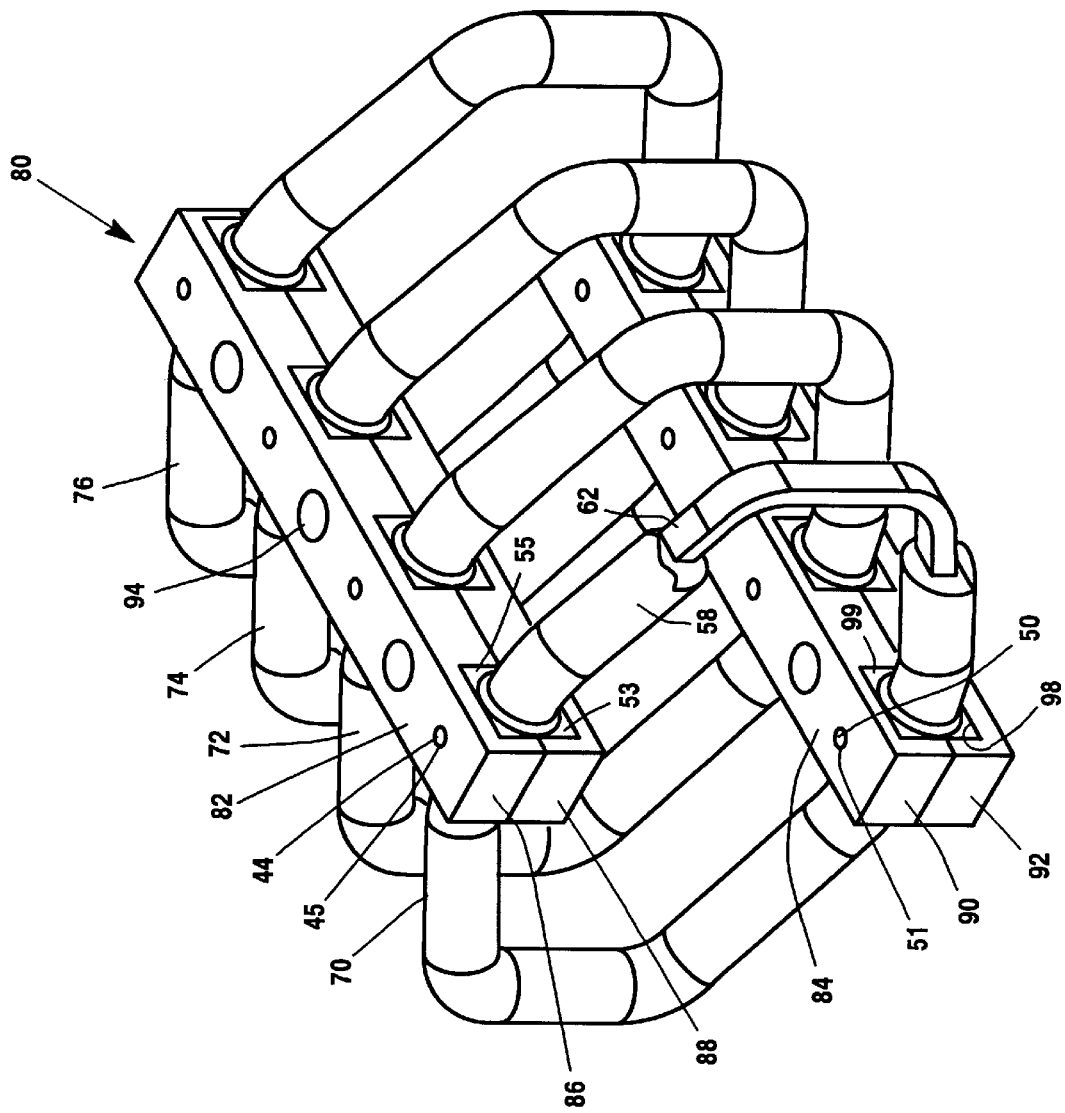
FIG. 3 is a composite shock mount in accordance with the invention in which four spring elements of FIG. 2 are joined at the top and the bottom by linking elements.

The invention is illustrated in FIGS. 1, 2, and 3; the basic spring shown in FIG. 1. Then spring element 10 preferably has a generally elliptical or oval shape, and is constructed of a spring material, for example, spring steel or stainless steel, to provide shock attenuation. The element 10 includes several relatively long and straight, flat, rectangular-shaped segments, such as the segments 12, 14, 18, 20, 22, and 30. These straight segment help to improve shock and vibration isolation by causing forces applied to the element 10 to be more uniformly distributed across the entire element. Furthermore, the areas of the element where the curvature changes more rapidly are provided with curved sections 24, 26, 32, 33, 34, 36, and 37 that resist collapse or breakage at these points.

The spring element 10 has a relatively short flat, straight, upper segment 40, has a hole 42 through it which receives a cylindrical pin 44. The relatively short, flat, straight, lower segment 46 that is parallel to the segment 40, also has a hole 48 in it into which the cylindrical pin 50 is secured. Rectangular blocks 52, 54 are preferably molded, or otherwise secured, around the pins 44 and 50, respectively. Elastomer coatings 56, 58 are molded, or otherwise provided to surround the other segments of the spring element. The elastomer coating assists to provide vibration damping and to prevent corrosion.

The spring elements 10 and 60 of FIGS. 1 and 2 may be used as a shock and vibration element by itself. However, a number of spring elements may be coupled together at distances spaced apart, as shown in FIG. 3. The spring element may be spaced uniformly or non-uniformly, in accordance with same spacing pattern required by the application in which the coupling links are employed. The composite spring mount 80 of FIG. 3 exhibits six degrees of freedom with respect to shock and vibration isolation and may be implemented with a wide range of different sized spring elements, from large to small.

The spring element 60 of FIG. 3, are retained in the assembly with their edges, such as the edge 62 of the spring element 70, aligned parallel to similar edges of the other spring elements 72, 74, and 76 of the composite spring mount 80. The upper coupling link 82 is constructed of two half sections 86, 88. The lower coupling link 84 also has two half sections 90, 92.

The upper section 86 and the lower section 88 of the upper link 82, are constructed so they fit together to enclose the blocks 52 and 54. The sections 86, 88 are formed with cavities 55, 56, which when assembled together, receive the block 52 therein. The pin 44 of the spring element 10 extends upwardly out of the block 52 on both the top side 53 and the bottom side (not shown) of the upper half section 86. This enables the pin 44 to be placed into the hole 45 of the upper half section 82 so that it preferably extends no further than the top surface of the upper half section 82. The lower coupling link 84 has an upper half section 90 and a lower half section 92 which are formed with cavities 96, 98 that receive the block 54. The pin 50 is received in the upper hole 51 in the upper half section 90 of the lower coupling link 84 and in a corresponding hole (not shown) in the lower half section 92. Each section of the composite spring mount 80 is constructed in a similar manner. The two sections of each link are secured together by conventional fasteners, such as bolts and nuts that are inserted into holes, such as the hole 94 that is preferably recessed from the upper and lower surfaces of the coupling links.

What is claimed is:

1. A spring element comprising a spring member of a generally elliptical shape that is defined by a relatively short axis and a relatively longer axis, a first mounting pin that extends in a normal direction through a first relatively short, straight segment of said elliptically-shaped spring member so that said first mounting pin is substantially aligned with the shorter of the two axis of said elliptically-shaped spring member and extends both inwardly and outwardly of said elliptically-shaped spring member, and a second mounting pin that extends in a normal direction through a second relatively short, straight segment that is parallel to said first relatively short, straight segment of said elliptically-shaped spring member so that said second mounting pin is substantially aligned with said first mounting pin and the shorter of the two axis of said elliptically-shaped spring element and extends both outwardly and inwardly of said elliptically-shaped spring member said spring element comprising first block that surrounds said first mounting pin and a portion of said spring member adjacent said first mounting pin so as to receive the extending ends of said first mounting pin therein in both the inward and outward directions of said elliptically-shaped spring member, and a second block that surrounds said second mounting pin so as to receive the extending ends of said second mounting pin therein in both the inward and outward directions of said elliptically-shaped spring member.

2. A spring element as claimed in claim 1 comprising; an elastomeric coating around substantially all of said spring element except for said first and second blocks.

3. A spring element as claimed in claim 1, wherein said elliptical shape is formed of first and second relatively short straight segments, which are parallel to each other and through which said shorter of the two axis of said elliptical shape passes, first and second curved segments on opposite sides of said first straight segment, third and fourth relatively short curved segments on opposite sides of said second straight segment; first and second relatively long straight segments parallel to each other through which the longer axis of said elliptically-shaped spring member passes; second and third curved segments on opposite sides of said relatively long first straight segment; fourth and fifth curved segments located on opposite sides of said relatively long third straight segments, A third, fourth, fifth, and sixth relatively long straight segments, each of which extend between one of said curved segments adjacent one of said relatively short straight first and second segments through which the shorter of said two axis of said elliptically-shaped spring member passes, and one of said curved segments adjacent one of said relatively short segments through which the longer of the said two axis of said elliptically-shaped spring member passes.

4. A spring element as claimed in claim 3 comprising; an elastomeric coating around substantially all of said spring element except for said first and second blocks.

5. A spring mount assembly comprising a plurality of spring elements, each of which are coupled together in a spaced-apart manner by a pair of spaced-apart parallel coupling links wherein each spring member comprises a spring material of a generally elliptical shape that is defined by a relatively short axis and a relatively longer axis, a first mounting pin that extends in a normal direction through a first relatively short straight segment of said elliptically-shaped spring member, so that said first mounting pin is substantially aligned with the shorter of the two axis of said elliptically-shaped spring member, and extends both inwardly and outwardly of said elliptically-shaped spring member, and a second mounting pin that extends in a normal direction through a second relatively short straight segment that is parallel to said first relatively short straight segment of said elliptically-shaped spring member, so that said second mounting pin is substantially aligned with said first mounting pin and the shorter of the two axis of said elliptically-shaped spring member and extends both outwardly and inwardly of said elliptically-shaped spring member, wherein said spring mount assembly comprises a first block that surrounds said first mounting pin and a portion of said spring member adjacent said first mounting pin, so as to receive the extending ends of said first mounting pin therein in both the inward and outward directions of said elliptically-shaped spring member, and a second block that surrounds said second mounting pin so as to receive the extending ends of said second mounting pin therein in both the inward and outward directions of said elliptically-shaped spring member.

6. A spring mount assembly as claimed in claim 5, wherein each of said spring elements comprises an elastomeric coating around substantially all of said spring element, except for said first and second blocks.

7. A spring mount assembly as claimed in claim 5, wherein each of the spring coupling links comprises a plurality of cavities each of which receives one of said first and second blocks.

8. A spring mount assembly as claimed in claim 7, wherein said spring elements comprises an elastomeric coating around substantially all of said first and second blocks.

* * * * *